United States Patent [19]
Heckelsberg et al.

[11] 3,870,763
[45] Mar. 11, 1975

[54] CONVERSION OF ACYCLIC POLYENES

[75] Inventors: Louis F. Heckelsberg; Robert L. Banks, both of Bartlesville, Okla.

[73] Assignee: Phillips Petroluem Company, Bartlesville, Okla.

[22] Filed: Nov. 29, 1971

[21] Appl. No.: 203,066

Related U.S. Application Data

[63] Continuation-in-part of Ser. No. 190,287, Oct. 18, 1971, abandoned, which is a continuation-in-part of Ser. No. 73,65, Jan. 28, 1970, abandoned, which is a continuation of Ser. No. 627,858, April 3, 1967, abandoned.

[52] U.S. Cl. ......... 260/666 A, 260/666 B, 260/673, 260/673.5, 260/680 R, 260/683 D, 260/677 R
[51] Int. Cl. .............................................. C07c 3/62
[58] Field of Search ....... 260/68 OR, 666 B, 683 D, 260/673, 673.5, 677 R

[56] References Cited
UNITED STATES PATENTS

| | | | |
|---|---|---|---|
| 2,217,014 | 10/1940 | Grosse et al. | 260/673.5 |
| 2,431,403 | 11/1947 | Johnson et al. | 260/666 B |
| 3,395,196 | 7/1968 | Heckelsberg | 260/683 D |
| 3,445,541 | 5/1969 | Heckelsberg et al. | 260/683 D |
| 3,527,828 | 9/1970 | Mango | 260/677 |
| 3,535,401 | 10/1970 | Calderon et al. | 260/683 D |
| 3,546,312 | 12/1970 | Heckelsberg et al. | 260/683 D |
| 3,586,731 | 6/1971 | Heckelsberg | 260/683 D |
| 3,660,507 | 5/1972 | Reusser | 260/666 A |
| 3,660,509 | 5/1972 | Arganbright | 260/666 A |
| 3,707,581 | 12/1972 | Heckelsberg | 260/683 D |
| 3,715,410 | 2/1973 | Ray et al. | 260/680 R |

*Primary Examiner*—Paul M. Coughlan, Jr.

[57] ABSTRACT

Acyclic polyenes are converted at a temperature in the range of about 600° to 1,200°F into other olefinic hydrocarbons having different numbers of carbon atoms and into aromatic hydrocarbon products by contacting the acyclic polyenes with a catalyst active for disproportionating propylene into ethylene and butene. Mixtures of acyclic polyenes and monoolefins are converted at a temperature in the range of about 150° to 1,200°F into other olefinic hydrocarbons having different numbers of carbon atoms by contact with a catalyst active for disproportionating propylene into ethylene and butene.

18 Claims, No Drawings

CONVERSION OF ACYCLIC POLYENES

CROSS REFERENCES TO RELATED APPLICATIONS

This application is a continuation-in-part of copending application Ser. No. 190,287, filed Oct. 18, 1971, now abandoned, said application Ser. No. 190,287 being a continuation-in-part application of application Ser. No. 7365, filed Jan. 28, 1970, now abandoned, which application Ser. No. 7365 is a continuation application of application Ser. No. 627,858, filed Apr. 3, 1967, now abandoned.

BACKGROUND OF THE INVENTION

1. Field of the Invention

This invention relates to the conversion of acyclic polyenes to produce olefinic products having different numbers of carbon atoms. In one aspect, this invention relates to the conversion of acyclic polyenes in the presence of a catalyst which is active for the disproportionation of propylene into ethylene and butene. In still another aspect, this invention relates to the conversion of acyclic polyenes in the olefin reaction process to produce olefinic products having different numbers of carbon atoms per molecule. In a still further aspect, this invention relates to the preparation of aromatic hydrocarbons from acyclic polyenes.

2. Description of the Prior Art

The olefin reaction is defined as a process for the catalytic conversion over a catalyst of feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

1. The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

2. The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene; the conversion of a mixture of 1,3-butadiene and propylene yields ethylene and 1,3-pentadiene;

3. The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene; the conversion of a mixture of ethylene and 1,3-pentadiene yields propylene and 1,3-butadiene;

4. The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene; the conversion of a mixture of cyclopentene and 1,5-hexadiene yields 1,6,10-undecatriene.

U.S. Pat. No. 2,217,014, Grosse et al, issued Oct. 8, 1940, discloses that nonconjugated diolefins such as 1,5-hexadiene undergo a ring closure-dehydrogenation reaction to produce benzene and when higher molecular weight nonconjugated diolefins are used, the products are alkyl derivatives of benzene.

SUMMARY OF THE INVENTION

According to the present invention, acyclic polyenes can be converted into other olefinic products by contacting the polyene alone or in combination with another acyclic polyene or with a cyclic mono- or polyene over a catalyst which is active for the disproportionation of propylene into ethylene and butene.

Further according to the present invention, a stream comprising a polyene and a monoene can be converted into other olefinic hydrocarbons having different numbers of carbon atoms per molecule by contacting the stream at temperatures in the range of about 0° to 1,200°F with a catalyst which has activity for the disproportionation of propylene into ethylene and butene.

Further according to the invention, a stream consisting essentially of one or more polyenes can be converted into olefinic hydrocarbons having different numbers of carbon atoms per molecule by contacting the stream with a catalyst which is active for a disproportionation of propylene into ethylene and butene at relatively high reaction temperatures, for example, temperatures in the range of about 600° to 1200°F.

And further according to the invention, a stream consisting essentially of a conjugated acyclic polyene can be converted to an aromatic hydrocarbon product by contacting the acyclic polyene with a catalyst active for the disproportionation of propylene into ethylene and butenes.

OBJECTS OF THE INVENTION

It is an object of this invention to convert acyclic polyenes into other olefinic hydrocarbons having different numbers of carbon atoms per molecule. It is also an object of this invention to convert a mixture of a polyene and a monoene into olefinic hydrocarbons having different numbers of carbon atoms per molecule. Still another object of this invention is to convert acyclic polyenes according to the olefin reaction. It is still a further object of this invention to provide aromatic hydrocarbons from conjugated acyclic polyenes. The provision of a catalyst for converting an acyclic polyene into olefinic hydrocarbons having a different number of carbon atoms per molecule is still another object of this invention. Other aspects, objects, and advantages of this invention will be apparent to one skilled in the art upon reading the disclosure including the detailed description of the invention.

DETAILED DESCRIPTION OF THE INVENTION

The present invention can be illustrated by the following reactions which occur over the olefin disproportionation catalyst.

A. The olefin reaction conversion of a nonconjugated acyclic polyene to form a mixture of products comprising at least one acyclic monoolefin having a fewer number of carbon atoms than the nonconjugated acyclic polyene feed and at least one acyclic polyene having a greater number of carbon atoms and at least one additional double bond than the nonconjugated acyclic polyene reactant:

(1)
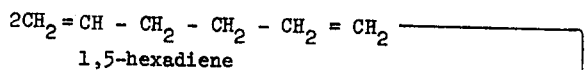
1,5-hexadiene

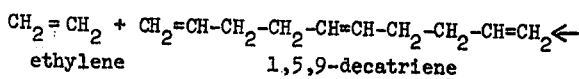
ethylene   1,5,9-decatriene

B. The olefin reaction conversion of a mixture of a conjugated or nonconjugated acyclic polyene and a cyclic monoene to produce a product comprising an acyclic polyene having a carbon atom number equal to the sum of the carbon atoms of the reactants and containing a number of double bonds equal to the sum of the double bonds of the reactants:

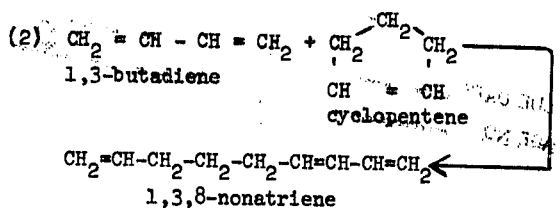
1,3,8-nonatriene

C. The olefin reaction conversion of a mixture of a conjugated or nonconjugated acyclic polyene with an acyclic monoene having at least 3 carbon atoms to provide a product comprising at least one acyclic monoolefin having a fewer number of carbon atoms than the monoene reactant and at least one acyclic polyene having a greater number of carbon atoms than the polyene reactant and having the same number of double bonds as the polyene reactant:

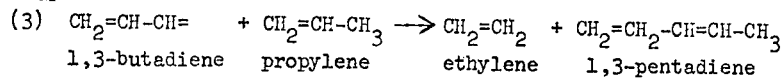

D. The conversion of a conjugated acyclic polyene to form a mixture of products comprising at least one acyclic monoolefin having a fewer number of carbon atoms than the nonconjugated acyclic polyene feed and at least one acyclic polyene having a greater number of carbon atoms and at least one additional double bond than the nonconjugated acyclic polyene reactant:

(4)
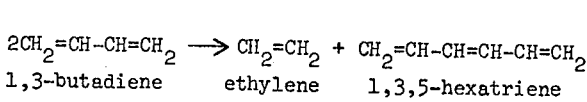

E. The conversion of a conjugated acyclic polyene to an aromatic hydrocarbon:

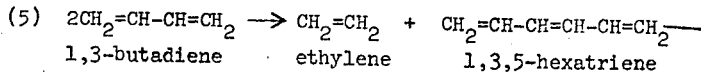

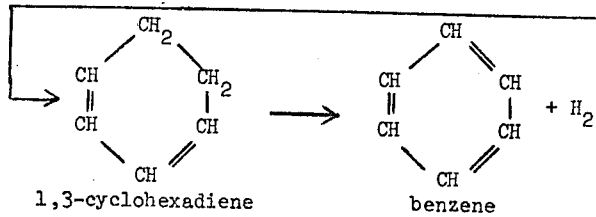

In the above reactions, double bond isomers of the acyclic polyenes are considered as the product acyclic polyene. All of the above reactions can occur in the presence of the olefin disproportionation catalyst. When conjugated polyenes are the reactant, both reactions D and E will occur. However, at low conversions, the amounts of aromatic hydrocarbons in the product are low and the primary product observed is the cyclic diolefin. At higher conversions, the amount of aromatic hydrocarbons in the product increases at the expense of cyclic diolefin compounds.

The catalysts which are useful for the present invention are those which have activity for the disproportionation of propylene into ethylene and butenes. Some examples of such catalysts are:

1. silica or thoria promoted by an oxide or compound convertible to an oxide by calcination of molybdenum or tungsten, or by a sulfide of tungsten or molybdenum; or by an oxide or a compound convertible to an oxide by calcination of rhenium or tellurium;

2. alumina promoted with an oxide or compound convertible to an oxide by calcination of molybdenum, tungsten, or rhenium; or by a sulfide of tungsten or molybdenum; or by an alkali metal salt, ammonium salt, alkaline earth metal salt, or bismuth salt of phosphomolybdic acid;

3. one or more of the group aluminum phosphate, zirconium phosphate, calcium phosphate, magnesium phosphate, or titanium phosphate promoted by one or more of a sulfide of molybdenum or tungsten; or by an oxide or compound convertible to an oxide by calcination of molybdenum, tungsten, or rhenium; or by magnesium tungstate or beryllium phosphotungstate; and 4. silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene followed by drying in a vacuum or in an inert atmosphere at about 50° to 700°F.

The catalytic agent is considered to be the reaction product resulting from the admixture of the support material and the promoter material which is subjected to activation treatment. Broadly, the catalyst contains 0.1 to 30 weight percent, preferably 1 to 20 weight percent, of promoter, and excellent results are obtained with 1 to 16 weight percent promoter. Within the above ranges, those catalysts containing greater amounts of the promoter material are generally more selective to aromatic compounds rather than to cyclic dienes or to acyclic trienes when converting conjugated dienes in accordance with the invention.

Any of the above catalysts may be impregnated with about 0.001 to 5 weight percent, preferably 0.01 to 2 weight percent, of an oxide, hydroxide, carbonate, bicarbonate or halide of an alkali metal or an alkaline earth metal, based on the total catalyst and calculated as the metal.

Additionally, the olefin disproportionation catalyst can sometimes be advantageously combined with another suitable catalyst having a foreign function. For example, it can be intimately mixed with another catalyst having activity for dehydrogenation. Some examples of such compatible dehydrogenation catalysts are $Ni/SiO_2$, $Cr_2O_3/Al_2O_3$, $Pt/Al_2O_3$, and the like. Alternatively, the catalyst having a foreign function can be combined in an arrangement wherein a bed of such a catalyst either precedes or follows a bed of the olefin disproportionation catalyst within the same reaction zone.

Similarly, the olefin disproportionation catalyst can be admixed with a suitable double bond isomerization catalyst to produce certain beneficial results to the process. Suitable isomerization catalysts include magnesium oxide, zinc oxide, calcium oxide and the like. Magnesium oxide is preferred because of its strong double bond isomerization activity in the presence of the solid catalysts mentioned above. Generally, the amount of the foreign-function catalysts employed will be from about 0.5 to 10 parts by weight per part of the olefin disproportionation catalysts.

The operating temperature for the process of this invention when using olefin disproportionation catalysts of (1) is in the range of about 400° to 1100°F. The process of this invention when using the catalysts of (2) will be operated at a temperature in the range of about 150° to 500°F. The process using the catalysts of (3) will be carried out at a temperature of about 600° to 1200°F. The process using the catalysts of (4) will be carried out at a temperature of about 0° to 600°F. The operating temperature when using a catalyst treated with a base or combined with another catalyst having dehydrogenation or isomerization activity is the same as reported above for the olefin reaction catalyst alone. In the process of the invention, pressures will be in the range of about 0 to 2,000 psig.

Other catalysts include those disclosed in Ser. No. 412,343, filed Nov. 19, 1964, now U.S. Pat. No. 3,395,196, issued July 30, 1968; Ser. No. 517,918, filed Jan. 3, 1966, now U.S. Pat. No. 3,442,969, issued May 6, 1969; Ser. No. 517,905, filed Jan. 3, 1966, now U.S. Pat. No. 3,444,262, issued May 13, 1969; Ser. No. 421,692, filed Dec. 28, 1964, now U.S. Pat. No. 3,418,390, issued Dec. 24, 1968; and U.S. Pat. No. 3,261,879, issued July 19, 1966.

Because of its great activity and effectiveness for the conversion of acyclic polyenes, the silica-supported tungsten oxide catalyst is greatly preferred, although other olefin disproportionation catalysts can also be used. The $WO_3/SiO_2$ catalyst is prepared for the conversion by conventional activation such as by calcination in air at a temperature at least as high as the subsequent reaction temperature. It can then, optionally, be contacted with flowing hydrogen at elevated temperatures. Flushing of the hot catalyst with an inert gas after contact with the air or hydrogen is frequently employed.

As mentioned above, acyclic conjugated dienes can be converted, according to this invention, to products such as acyclic trienes or substituted or unsubstituted hexadienes. They can also be converted further to aromatics.

When aromatics are the desired products, they can be maximized by choosing the proper conditions. In general, the aromatic product is maximized by using the silica-supported tungsten oxide catalyst, particularly when it contains sufficient tungsten oxide to be in the range of 8 to 16 weight percent. Such catalysts containing 1 to 3 weight percent WO$_3$, on the other hand, favor the production of the hexadiene products. Reaction temperatures of 1,000°F or higher also favor aromatic production. Relatively low pressures, such as pressures less than 100 psig also favor aromatics.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having from 3 to 30 carbon atoms per molecule and with such cyclic olefins having 4 to 30 carbon atoms per molecule.

Some specific examples of acyclic olefins suitable for reactions of this invention include propylene, 1-butene, isobutene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2,7,7-diethyl-1,3,5-decatriene, 1,3,5,7,9-octadecapentaene, 1,3-eicosadiene, allylbenzene, 3-eicosene, and 3-heptene, and the like and mixtures thereof.

Some specific examples of cyclic olefins suitable for the reactions of this invention are cyclobutene, cyclopentene, cyclohexene, 3-methylcyclopentene, 4-ethylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 4-benzylcyclohexene, 2-methyl-6-ethylcyclooctadiene-1,4, and the like, and mixtures thereof.

When converting conjugated acyclic dienes, such as butadiene, oligomers of the conjugated diene, such as 4-vinylcyclohexene, function as the acyclic diene. That is, under the conditions of the reaction, the cyclic oligomer can crack to form the acyclic polyene reactant which can then undergo the conversions described above.

Acyclic polyenes particularly suitable for this invention are those containing from 4 to about 30 carbon atoms per molecule. Acyclic dienes and trienes containing 4 to 12 carbon atoms are especially suited for our invention. Some nonlimiting examples are: 1,3-butadiene, 1,3-pentadiene, 1,4-pentadiene, 1,4-hexadiene, 1,5-hexadiene, 4-ethyl-2,5-heptadiene, 1,3,5-octatriene, 1,3-dodecadiene, 1,3,6-dodecatriene, 5-methyl-1,3,6-heptatriene, 1,4,9-decatriene, and the like, and mixtures thereof.

With a fixed-bed reactor and continuous operation, weight hourly space velocities in the range of 0.5 to 1,000 parts by weight of hydrocarbon feed per part by weight of catalyst per hour are suitable with excellent results having been obtained in the range of 1 to 200 and still more preferably, 5 to 50 WHSV. Space rates generally have an appreciable effect on conversion. When conversions are high (low space rates) aromatic products are favored when converting conjugated dienes. At lower conversions (high space rates) cyclic dienes and acyclic trienes are the favored products from this reaction.

The process according to this invention can be carried out either in the presence or absence of a diluent. Diluents comprising paraffinic and cycloparaffinic hydrocarbons can be employed. Suitable diluents include, for example, propane, cyclohexane, methylcyclohexane, normal pentane, normal hexane, isooctane, dodecane, and the like, or mixtures thereof, including primarily those paraffins and cycloparaffins having up to about 12 carbon atoms per molecule. The diluent should be nonreactive under the conditions of the olefin reaction.

Although dilution of the feed olefins can be beneficial when converting acyclic polyenes to mixtures of acyclic olefin products, it has been found especially beneficial when converting conjugated acyclic polyenes to aromatic hydrocarbon products. Some of the side reactions which can take place are exothermic and can cause coke formation on the catalyst due to overheating. This can greatly reduce the life of the olefin disproportionation catalyst. The exothermic nature of the reaction is believed to result from the polymerization reactions which can take place.

Use of the paraffins to dilute the feed material extends the run duration of the catalyst and gives the additional benefit of increased selectivity to aromatics and greater efficiency to disproportionation products. The extent of feed dilution is not critical but should be sufficient to minimize carbon deposition on the catalyst. Generally, the feed can contain from 10 weight percent to 95 weight percent of the aliphatic diluent, although amounts from about 35 weight percent to about 80 weight percent are preferred. Light paraffins are preferred, such as butane, pentane, hexane, heptane, isooctane, and the like.

When the polyene-containing stream contains mixtures of olefinic materials such as both a polyene and a monoene or a cyclic and an acyclic material, the proportion of such materials in the reaction zone can vary broadly but will generally be in the range of from about 1:20 to about 20:1 by weight.

When converting conjugated acyclic polyenes, the presence of small amounts of hydrogen in the feed is sometimes beneficial to the process. Thus, from 0.1 to about 2 moles of hydrogen per mole of feed polyene can be employed, if desired. Generally, the presence of hydrogen will significantly increase conversion, but selectivities to desired products are reduced somewhat due to the hydrogenation of a small portion of the acyclic polyene reactant to the corresponding monoene or saturated hydrocarbon.

Alternatively, the feed can be mildly hydrotreated in a separate hydrogenation zone prior to contact with the olefin disproportionation catalyst.

The following specific embodiments of the invention will be helpful in attaining an understanding of the invention. These, however, should be considered as exemplary and not as unduly limiting the invention.

EXAMPLE I

A silica-supported tungsten oxide catalyst (containing about 8 weight percent tungsten oxide) was impregnated with sufficient sodium carbonate to contain, after calcination, 0.15 weight percent sodium (calculated as the metal though present as an oxide).

A quantity of the above catalyst was charged into a fixed-bed reactor. A quantity of glass beads was placed upstream as a preheat zone. The catalyst was activated within the reactor in flowing dry air for one hour at 1100°F. It was then flushed with nitrogen while being cooled to 1000°F.

A feedstream containing 46 weight percent propylene and 54 weight percent butadiene was passed into the reactor at atmospheric pressure and at 1000°F. The effluent from the reactor was periodically sampled and analyzed by gas-liquid chromatography. The results of these analyses are shown in the following table:

TABLE I

Conversion of Propylene and Butadiene-1,3 to Pentadienes and Ethylene

| Time on stream, hours | 1 | 1½ | 2 | 3 |
|---|---|---|---|---|
| Temperature, °F | 1000 | 1000 | 1000 | 1000 |
| Space rate* | 8 | 12 | 12 | 20 |
| Effluent Analysis, Wt. % | | | | |
| Ethylene | 2.6 | 2.8 | 3.1 | 2.3 |
| Propylene | 36.3 | 35.8 | 36.5 | 35.8 |
| 1-Butene | 1.3 | 1.1 | 0.7 | 0.8 |
| t-2-Butene | 3.3 | 3.0 | 2.7 | 2.5 |
| c-2-Butene | 2.8 | 2.7 | 2.5 | 2.2 |
| Butadiene-1,3 | 38.0 | 36.5 | 36.5 | 40.3 |
| 1-t-3-Pentadiene | 6.3 | 6.5 | 6.4 | 5.3 |
| 1-c-3-Pentadiene | 3.7 | 3.7 | 4.0 | 3.3 |
| Dimers | 5.7 | 7.9 | 7.6 | 7.5 |
| Conversion, % | 26 | 28 | 26 | 24 |
| Eff. to $C_5^{2=} + C_2^=$ | 49 | 47 | 52 | 46 |

*Parts by weight of feed per part by weight of catalyst per hour.

The analyses in the table above show that a substantial quantity of the propylene and butadiene reacted to produce other olefin products including the 1,3-pentadienes and ethylene.

EXAMPLE II

Butadiene and isobutene were converted, using the same catalyst and procedure as that of the preceding example.

The catalytic bed was regenerated by a repeat of the previous activation procedure. A feedstream containing 51 weight percent isobutene and 49 weight percent butadiene-1,3 was passed through the reactor at 1,000°F and atmospheric pressure. The effluent from a series of runs carried out under varying conditions was analyzed, and the results are seen in the following table:

TABLE II

Conversion of Isobutene and Butadiene-1,3 to Ethylene and Hexadiene

| Time on stream, hours | 1 | 2 | 3 |
|---|---|---|---|
| Temperature, °F | 1000 | 1000 | 1000 |
| Space rate* | 18 | 21 | 22 |
| Effluent Analysis, Wt. % | | | |
| Ethylene | 2.3 | 2.1 | 1.6 |
| Propylene | t | t | t |
| Isobutene | 54.6 | 52.4 | 51.3 |
| t-2-Butene | t | t | t |
| c-2-Butene | t | t | t |
| Butadiene | 36.1 | 40.5 | 43.6 |
| 4-Me-1,3-Pentadiene | 7.0 | 5.0 | 3.5 |
| Conversion, % | 9 | 7 | 5 |

*Parts by weight feed per part by weight catalyst per hour.

The data in the table above show that a substantial quantity of isobutene and butadiene were converted to other olefinic products including ethylene and 4-methyl-1,3-pentadiene.

EXAMPLE III

Using the same procedure, apparatus and catalyst (regenerated) of the preceding examples, a feedstream consisting of 45 weight percent of trans-2-butene and 55 weight percent butadiene-1,3 was passed into the reactor at atmospheric pressure and 1,000°F. The effluent was analyzed periodically and the results are shown in the table below:

TABLE III

Conversion of Butadiene-1,3 and trans-2-Butene to Other Olefins

| Time on stream, hours | 1 | 2 | 3 |
|---|---|---|---|
| Temperature, °F | 1000 | 1000 | 1000 |
| Space rate* | 18 | 24 | 18 |
| Effluent Analysis, Wt. % | | | |
| Ethylene | 2.8 | 2.7 | 2.1 |
| Propylene | 37.7 | 19.8 | 18.6 |
| 1-Butene | 3.7 | 1.6 | 1.9 |
| t-2-Butene | 14.1 | 27.9 | 27.8 |
| c-2-Butene | 7.8 | 4.2 | 4.6 |
| Butadiene | 10.7 | 28.5 | 26.9 |
| Pentenes | t | t | t |
| 1-t-3-Pentadiene | 7.9 | 6.8 | 7.2 |
| 1-c-3-Pentadiene | 4.1 | 3.3 | 7.0 |
| Dimers, etc. | 11.2 | 5.2 | 7.0 |
| Conversion, % | 64 | 39 | 39 |
| Eff. to $C_3^= + C_5^{2=}$ | 78 | 76 | 77 |

*Parts by weight feed per part by weight catalyst per hour.

The data in the preceding table show that a substantial portion of the feedstream was converted to other olefinic products including 1,3-pentadienes.

In essentially the same manner, a mixture of isoprene and trans-2-butene was converted over the same system at 1,000°F to produce an effluent which contained what is believed to be 2-methyl- or 3-methyl-1,3-pentadiene.

EXAMPLE IV

A silica-supported tungsten oxide catalyst (containing about 8 weight percent tungsten oxide) was impregnated with sufficient sodium carbonate to contain, after calcination, 0.15 weight percent sodium (calculated as the metal, though probably present as oxide).

A quantity of the above catalyst was charged into a tubular steel fixed-bed reactor. A quantity of glass beads was placed upstream as a preheat zone. The catalyst was regenerated (it had previously been used in another test) within the reactor in flowing dry air at 1,100°F for 1 hour. The catalyst bed was then flushed with nitrogen while being cooled to 1,000°F.

Butadiene-1,3 (special purity) was passed into the reactor at a flow rate of 26 parts by weight feed per part by weight catalyst/hour, at a temperature of 1,000°F and at atmospheric pressure. After 75 minutes, the reactor effluent was sampled and analyzed by gas-liquid chromatography. The results are shown below in weights percent.

TABLE IV

| Conversion of Butadiene-1,3 | |
| --- | --- |
| Ethylene | 2.5 |
| Propylene | 0.3 |
| Butenes | 1.0 |
| 1,3-Butadiene | 91.5 |
| Heavier | 4.7 |

This analysis showed, by the presence of olefins both lighter and heavier than the butadiene, that disproportionation of this polyene took place.

To further analyze the products obtained, the total effluent from the reaction was collected and left in an open container overnight to weather off the lighter components. The residual components of the mixture were further analyzed, in weights percent.

TABLE V

| 1,3-Butadiene | 25 |
| --- | --- |
| 1,3(or 4)-Cyclohexdiene | 38 |
| 4-Vinylcyclohexene | 23 |
| 4-Vinylcyclohexene (isomer of) | 14 |

The data in the table above show that a substantial quantity of the 1,3-butadiene feed was converted to olefin disproportionation products. The cyclohexadiene is believed to have been rapidly formed from the 1,3,5-hexatriene which was probably the primary heavier disproportionation product.

EXAMPLE V

A quantity of the same catalyst as used in Example I above was charged into the same steel tubular reactor and similarly regenerated.

A feedstream consisting of 21 weight percent of 1,5-hexadiene and 79 weight percent heptane diluent was passed into the reaction zone at 1000°F, atmospheric pressure, and at space rates of 4–20 v/v/hour (gaseous hourly space velocity).

The effluent from the reaction zone was qualitatively analyzed and the presence of ethylene and propylene was observed as well as some $C_8$ and $C_9$ products. The presence of these olefinic products both heavier and lighter than the feed material indicated disproportionation had taken place.

EXAMPLE VI

A tungsten oxide on silica catalyst (active for disproportionation of propylene to ethylene and butenes) was used to convert 1,5-hexadiene at 1,000°F, atmospheric pressure, and about 1 second contact time. The effluent was passed through a dry ice trap which collected the liquid hydrocarbons while the gaseous hydrocarbons passed through the volume measurements using a wet test meter. Samples of the liquid were collected for 0–45-minute and 45–90 minute periods during the run.

The 1,5-hexadiene feed had the following composition:

| | |
| --- | --- |
| Lights | 1.02 wt. % |
| 1,5-Hexadiene and 2,4-hexadiene (more than 97% 1,5-hexadiene) | 94.30 wt. % |
| Other $C_6$'s | 4.68 wt. % |

Analysis of the effluent gas samples gave the following compositions:

TABLE VI

| Time (Minutes) | 10 | 30 | 50 | 70 | 90 |
| --- | --- | --- | --- | --- | --- |
| Hydrocarbon, % | | | | | |
| Inerts* | 9.3 | 6.1 | 6.4 | 6.3 | 6.5 |
| Ethylene | 15.3 | 10.1 | 5.6 | 4.8 | 5.4 |
| Propylene | 73.5 | 78.4 | 82.2 | 83.4 | 82.6 |
| 1-Butene | 1.9 | 2.1 | 2.1 | 2.3 | 2.3 |
| trans-2-Butene | — | trace | 1.2 | 1.2 | 1.4 |
| cis-2-Butene | — | trace | 0.7 | 0.6 | 0.7 |
| Butadiene | — | 3.3 | 1.8 | 1.4 | 0.7 |

*Nitrogen was used to pressure the hexadiene feed.

Analysis of the effluent liquid samples gave the following compositions:

TABLE VII

| Sample | 0–45 Minutes | 45–90 Minutes |
| --- | --- | --- |
| Hydrocarbon, % | | |
| $C_4$ and lighter | 3.78 | 2.93 |
| $C_5$ | 2.13 | 1.76 |
| $C_6$ | 72.67 | 64.24 |
| $C_7$ | 11.22 | 20.62 |
| $C_8$ | 1.87 | 2.16 |
| $C_9$ | 2.83 | 2.81 |
| $C_{10}$ | 2.98 | 2.09 |
| $C_{11}$ | 0.78 | 0.62 |
| $C_{12}$ | 0.82 | 1.22 |
| $C_{13}$ | 0.13 | 0.17 |
| Aromatics* | 0.80 | 1.37 |

*Fourteen aromatic compounds were identified of which p-xylene and propylbenzene were present in the largest amounts.

The overall results of this run are summarized as follows:

TABLE VIII

| Sample | 0–45 Minutes | 45–90 Minutes |
| --- | --- | --- |
| Temperature, °F | 1000 | 1000 |
| Space rate, WHSV | 9.6 | 7.8 |
| Contact time, seconds | 0.8 | 1.0 |
| Hexadiene conversion, % | 49 | 70 |
| Disproportionation, % | 48 | 69 |
| Aromatics in total effluent, % | 0.5 | 0.7 |
| Aromatics in product, % | 1.1 | 1.0 |

These data indicate that 1,5-hexadiene can be converted to product acyclic olefinic products with only minor conversion to aromatics. It is noted that the Grosse et al patent, mentioned above, converts this feed material to benzene. However, using the olefin disproportionation catalyst, production of benzene from 1,5-hexadiene is very low since the principal aromatic hydrocarbons are propylbenzene and para-xylene.

EXAMPLE VII

In a manner similar to Example II, a feedstream containing 50 weight percent of butadiene and 50 weight percent isobutene was passed over a tungsten oxide on silica catalyst (containing 8 weight percent $WO_3$) at 1,000°F, atmospheric pressure and at a WHSV of 27. Initially the conversion of the feed material was relatively low, and the principal products of the reaction were methylpentadiene and ethylene as reported in Example II. However, after a period of 150–180 minutes an analysis of the effluent showed the following results.

TABLE IX

| Hydrocarbon | Weight % |
|---|---|
| Ethylene | 2.0 |
| Propane | 0.6 |
| Propylene | 1.8 |
| Isobutene | 41.8 |
| trans-2-Butene | 0.8 |
| cis-2-Butene | 0.7 |
| Butadiene | 34.8 |
| Isoprene | 0.4 |
| 2-Methyl-1,4-pentadiene | 1.6 |
| 1,5-Hexadiene | 0.9 |
| Unknown | 0.5 |
| Unknown | 1.0 |
| 4-Methyl-1,4-pentadiene | 1.0 |
| Heavies (mostly benzene) | 12.1 |

The above example clearly illustrates that as conversion increases with time over the catalyst, the efficiency of the reaction to aromatic hydrocarbon products is seen to increase.

EXAMPLE VIII

Pentadiene-1,3 was converted to aromatic hydrocarbons, principally toluene, by passing a stream of the pentadiene over a tungsten oxide on silica disproportionation catalyst at a temperature of 1000°F, atmospheric pressure, and 17 WHSV. Light gas was vented and the liquid hydrocarbons of the effluent were collected in a dry ice trap. Analysis of the effluent collected during the 60–90-minute interval of the run gave the following results:

TABLE X

| Hydrocarbon | Weight % |
|---|---|
| Butadiene | 4.6 |
| Pentenes | 19.4 |
| Pentadiene | 56.0 |
| Unknown 1 | 25 |
| Unknown 2 | 4.8 |
| Unknown 3 | 1.0 |

TABLE X—Continued

| Hydrocarbon | Weight % |
|---|---|
| Benzene | 1.8 |
| Unknown 4 | 1.0 |
| Toluene | 5.1 |
| Xylene | 1.6 |
| Xylene isomer | 2.2 |
| Conversion, % | 44 |
| Selectivity to aromatics, % | 20 |

The expected olefin disproportionation products from 1,3-pentadiene conversion include ethylene, butadiene, 2,4,6-octatriene and 2,4-hexadiene. The presence of xylene is accounted for by reaction D mentioned above, i.e., cyclization of 2,4,6-octatriene with subsequent dehydrogenation. Toluene can be accounted for by the reaction of one molecule of butadiene with one molecule of pentadiene to form ethylene and 1,3,5-heptatriene with cyclization of the triene and dehydrogenation to produce toluene.

EXAMPLE IX

Isoprene was passed over a tungsten oxide on silica catalyst which had been treated with sodium (as in Example IV) at a temperature of 1,000°F, atmospheric pressure and 4 WHSV. An analysis of the liquid hydrocarbons in the effluent collected at the 60–120-minute interval into the run gave the following results:

TABLE XI

| Hydrocarbon | Weight % |
|---|---|
| $C_5$'s | 43.4 |
| Isoprene | 43.8 |
| Unknown 1 | 1.1 |
| Benzene | 0.2 |
| Unknown 2 | 0.1 |
| Toluene | 1.1 |
| Unknown 3 | 1.2 |
| p-Xylene | 1.8 |
| Unknown (possibly o-xylene) | 0.1 |
| Unknown (heavies) | 6.2 |
| Conversion, % | 56.2 |

This example demonstrates that a branched acyclic polyene can be converted to aromatic hydrocarbons, particularly xylenes, according to our invention.

EXAMPLE X

The effect of dilution of a butadiene feed with butane was demonstrated in a number of runs which utilized a catalyst containing 8 percent $WO_3/SiO_2$, a temperature of 1,000°F, atmospheric pressure, and a space rate of 25 WHSV. Samples were taken at different periods in the run. The results are shown in Table XII below.

TABLE XII

Conversion of Butane-Diluted Butadiene

| Run Period, Minutes | 0–60 | 60–120 | 120–180 | 180–240 |
|---|---|---|---|---|
| | Undiluted Butadiene | | | |
| Butadiene conversion, % | 33 | 48 | 17 | 9 |
| Selectivity to aromatics, % | 32 | 45 | 20 | 6 |
| Efficiency to disp. products, % | 65 | 70 | 45 | 23 |
| | 57% Butadiene + 43% n-Butane | | | |

TABLE XII -Continued

| Conversion of Butane-Diluted Butadiene | | | | |
|---|---|---|---|---|
| Run Period, Minutes | 0–60 | 60–120 | 120–180 | 180–240 |
| Butadiene conversion, % | 8 | 14 | 26 | 25 |
| Selectivity to aromatics, % | — | 14 | 26 | 30 |
| Efficiency to disp. products, % | — | 51 | 74 | 84 |
| 40% Butadiene + 60% n-Butane | | | | |
| Butadiene conversion, % | 4 | 24 | 28 | 25 |
| Selectivity to aromatics % | 13 | 25 | 25 | 22 |
| Efficiency to disp. products, % | 56 | 80 | 71 | 65 |
| 33% Butadiene + 67% n-Butane | | | | |
| Butadiene conversion, % | 5 | 20 | 28 | 42 |
| Selectivity to aromatics, % | — | 24 | 35 | 43 |
| Efficiency to disp. products, % | — | 67 | 85 | 88 |

Notes:
— amount of butadiene converted.
Selectivity — amount of aromatics formed by the amount of butadiene converted × 100 (72 maximum).
Efficiency — amount of ethylene, propylene, $C_6$ ring olefins and aromatics divided by amount of butadiene converted × 100.

These data show that butene dilution of the feed resulted in longer run periods, increased conversion, and increased efficiency to disproportionation products. Essentially equivalent results were obtained using pentane as a diluent.

EXAMPLE XI

In two runs butadiene was converted to aromatic hydrocarbons, principally benzene, by adding magnesium oxide to the reaction zone. As in the preceding example the feed was diluted with n-butane. A control run was also made wherein the magnesium oxide catalyst was not used in the reactor. The reaction conditions and results are summarized in Table XIII below.

This example demonstrates that the presence of the double bond isomerization catalyst magnesium oxide has a beneficial effect in converting butadiene-1,3 to aromatics by increasing the conversion of butadiene.

EXAMPLE XII

Butadiene was converted by contact with a 3% $WO_3$/$SiO_2$ catalyst at 950°–970°F, atmospheric pressure, and at 15 WHSV. The feed was 50 percent butadiene and 50 percent n-butane. The results, after sampling at various periods, are shown in the table below.

TABLE XIII

Catalyst: A. 12 weight percent tungsten oxide on silica.
B. 1 part 12 weight percent tungsten oxide on silica mixed with 2 parts magnesium oxide.
Temperature: 1000°F.
WHSV: 25
Feed: 40 weight percent 1,3-butadiene and 60 weight percent n-butane.

| Run period, minutes | 0–60 | 60–120 | 120–180 | 180–240 |
|---|---|---|---|---|
| Catalyst A | | | | |
| Butadiene conversion, % | 13 | 61 | 63 | 55 |
| Selectivity to aromatics, % | 24 | 49 | 48 | 46 |
| Disproportionation efficiency, % | 64 | 88 | 84 | 86 |
| Catalyst B | | | | |
| Butadiene conversion, % | 17 | 47 | 67 | 61 |
| Selectivity to aromatics, % | 29 | 47 | 54 | 46 |
| Disproportionation efficiency, % | 32 | 64 | 80 | 77 |

Note: Selectivity and efficiency as in Example X.

TABLE XIV

| Conversion of Butadiene | | | | | |
|---|---|---|---|---|---|
| | Analyses of Effluent, Wt. % | | | | |
| Sample interval, minutes | 60–120 | 180–240 | 270–330 | 360–420 | 540–600 |
| Ethylene | 0.4 | 1.6 | 1.9 | 1.9 | 1.6 |
| Propylene | t | 0.3 | 0.4 | 0.9 | 0.6 |
| n-Butane | 50.4 | 50.2 | 49.3 | 50.2 | 50.4 |
| Butene-1 | 0 | 0 | t | t | 0 |
| trans-Butene-2 | t | t | t | 0.3 | 0.6 |
| cis-Butene-2 | t | t | t | 0.2 | 0.4 |
| Butadiene-1,3 | 44.7 | 33.4 | 32.9 | 31.2 | 36.4 |
| Pentenes | 0 | 0 | 0 | t | t |
| Cyclopentene | 0 | 0 | 0 | t | t |
| trans-Pentadiene-1,3 | 0.1 | 0.4 | 0.5 | 0.6 | 0.5 |
| cis-Pentadiene-1,3 | 0 | 0.2 | 0.3 | 0.3 | 0.3 |
| Cyclohexane | t | t | t | t | t |
| Unknown | t | t | t | t | t |
| Cyclohexadiene | 1.9 | 8.2 | 9.4 | 8.7 | 4.6 |
| Unknown | 0 | t | t | t | t |
| Benzene | 0.5 | 2.8 | 3.5 | 4.3 | 3.0 |
| Vinylcyclohexane | 2.0 | 2.9 | 1.8 | 1.4 | 1.6 |
| Toluene | 0 | t | t | t | t |
| Butadiene conversion, % | 10 | 33 | 35 | 37 | 27 |
| Selectivity to hexadiene | 39 | 50 | 53 | 47 | 35 |
| Disproportionation eff., % | 57 | 79 | 86 | 85 | 74 |

Notes: Selectivity to hexadiene — amount of cyclohexadiene formed divided by amount of butadiene converted × 100.
Disproportionation efficiency — amount of ethylene, propylene, $C_6$ ring olefins and aromatics formed divided by amount of butadiene converted.

These data illustrate that the cyclohexadiene product can be favored by using a $WO_3/SiO_2$ catalyst having a relatively low $WO_3$ content, and by using reaction temperatures below 1,000°F. They also show that runs as long as 10 hours can be used.

EXAMPLE XIII

Butadiene was converted to disproportionation products and aromatic products by contact with a catalyst system consisting of a bed of an 8% $WO_3/SiO_2$ olefin disproportionation catalyst followed by a bed of a $Ni/SiO_2$ dehydrogenation catalyst. Both catalyst beds were located in the same reactor such that the feed passed first through the disproportionation zone, then through the dehydrogenation zone. For comparison, a run without the presence of the dehydrogenation catalyst was also made. The runs were carried out at 1,000°–1,035°F, at atmospheric pressure and at 25 WHSV. The feed was 40 percent butadiene and 60 percent n-butane. The results are shown in Table XV below.

TABLE XV

Conversion of Butadiene Using Combination of Catalysts

| Run Period, min. | Conversion, % | Selectivity to Aromatics, % | Efficiency, % |
|---|---|---|---|
| Through $WO_3/SiO_2$ Catalyst | | | |
| 30–60 | 23 | 28 | 81 |
| 90–120 | 50 | 39 | 84 |
| 150–180 | 55 | 44 | 86 |
| 210–240 | 53 | 42 | 84 |
| Through $WO_3/SiO_2$ and $Ni/SiO_2$ | | | |
| 0–60 | 28 | 47 | 74 |
| 60–120 | 59 | 56 | 85 |
| 120–180 | 61 | 54 | 85 |
| 180–240 | 56 | 47 | 84 |

Notes: Conversion, selectivity to aromatics, and efficiency as defined in Example X.

These data show that the combined catalyst system increased the amount of aromatics formed by about 20 percent. Similar results were obtained using other dehydrogenation catalysts such as $Pt/Al_2O_3$.

EXAMPLE XIV

Butadiene was converted to cyclohexadiene and benzene at different space rates using an 8% tungsten oxide on silica catalyst activated in a manner similar to the preceding examples. The feed was again diluted with butane. The reaction conditions and results are set forth below.

TABLE XVI

| Run No. | Conditions | |
|---|---|---|
| | 1 | 3 |
| Butadiene, Wt. % | 42 | 40 |
| Temperature, °F | 986° | 1004° |
| Pressure, psig | 0 | 0 |
| Space Rate, g/g per hour | 24 | 100 |
| Results | | |
| Butadiene Conversion | 53.5 | 17.5 |
| Product Composition, Wt % | | |
| Ethylene | 5.4 | 12.8 |
| Propylene | 4.0 | 2.9 |
| Butenes | 1.3 | 4.3 |
| Pentadienes | 5.4 | 2.9 |
| Cyclohexadiene | 33.1 | 41.4 |
| Conditions | | |
| Benzene | 38.4 | 21.4 |
| Toluene | 2.7 | (a) |
| Vinylcyclohexene | 3.6 | 14.3 |
| Others | 4.8 | (a) |
| Coke | 1.3 | (b) |

(a) Trace amounts
(b) Not determined

The above example demonstrates that at high conversions (low space rate) benzene in the product is favored over cyclohexadiene. However, at lower conversions (higher space rate) cyclohexadiene is favored over benzene in the product.

In a manner similar to that of the preceding examples, other olefin disproportionation catalysts and other acyclic polyenes were tested and found to be operable in varying degrees. The $MoO_3/SiO_2$ catalyst was found to be active for the conversion of 1,3-pentadiene but with poorer selectivities. The $WO_3/AlPO_4$ catalyst catalyzed the conversion of butadiene but with lower conversions, selectivities, and efficiencies.

In addition to the butadiene, isoprene, 1,3-pentadiene, and 1,5-hexadiene shown in the preceding examples, the present inventive process was also used to convert 1,4-hexadiene and 1,5-heptadiene. These latter olefins reacted rapidly at 900°F to yield a large number of olefinic products.

Reasonable variations and modifications of our discovery will be readily apparent to those skilled in the art without departing from the spirit and scope of the invention.

What is claimed is:

1. The process of converting an acyclic polyene in the olefin reaction process to produce at least one olefinic hydrocarbon having a different number of carbon atoms per molecule than the acyclic polyene which comprises contacting at a reaction temperature in the range of about 400° to 1100°F a feedstream containing said acyclic polyene with a catalyst active for disproportionation of propylene into ethylene and butene and under conditions selected within the temperature range for which the selected catalyst is active for promoting the olefin reaction process which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, the amount of said acyclic polyene in said stream being at least about 1 part per 20 parts of any monoolefin present, there being at least about 1 part of monoolefin per 20 parts of acyclic polyene when the reaction temperature is less than about 600°F wherein said catalyst is a. silica promoted by an oxide of tungsten.

2. The process of claim 1 wherein
said acyclic polyene has 4 to 30 carbon atoms per molecule.

3. The process of claim 2 wherein the feedstream comprises a monoene and a polyene in a ratio of monoene to polyene in the range of 1:20 to 20:1.

4. The process of claim 1 wherein the feedstream is a conjugated or nonconjugated acyclic polyene having from 4 to 30 carbon atoms per molecule and the product of the reaction comprises a mixture of at least one acyclic monoolefin having a lesser number of carbon atoms than the feed acyclic polyene and at least one heavier acyclic polyene having a greater number of carbon atoms than the feed acyclic polyene and also having at least one additional double bond than the feed acyclic polyene, or an isomer of said heavier acyclic polyene.

5. The process of claim 4 wherein the feed acyclic polyene is butadiene-1,3 and the product of the reaction comprises the ethylene and 1,3-cyclohexadiene.

6. The process of claim 4 wherein the feed acyclic polyene is a conjugated acyclic polyene and the product of the reaction comprises an aromatic hydrocarbon.

7. The process of claim 6 wherein the feed acyclic polyene is butadiene-1,3 and the product of the reaction comprises benzene.

8. The process of claim 1 wherein the feed comprises a nonconjugated acyclic polyene and the product of the reaction comprises a mixture of at least one acyclic monoolefin having a lesser number of carbon atoms than the feed polyene and at least one heavier acyclic polyene having a greater number of carbon atoms than the feed polyene and at least one additional double bond than the feed polyene, or an isomer of said heavier acyclic polyene.

9. The process of claim 8 wherein the feed polyene is 1,5-hexadiene and the product of the reaction comprises a mixture of ethylene and 1,5,9-decatriene.

10. The process of claim 1 wherein a conjugated acyclic polyene and a monoene are converted to a product mixture comprising at least one acyclic monoene having a lesser number of carbon atoms than the reactant monoene and at least one acyclic polyene having a greater number of carbon atoms than the reactant acyclic polyene and wherein the number of double bonds in the acyclic polyene product and acyclic polyene reactant are the same.

11. The process of claim 10 wherein the feed acyclic polyene is 1,3-butadiene, the feed monoene is propylene, and the product of the reaction comprises a mixture of ethylene and 1,3-pentadiene.

12. The process of claim 2 wherein the feedstream consists essentially of a polyene and said temperature is in the range of about 600° to 1100°F.

13. The process of claim 2 wherein the feedstream comprises propylene and 1,3-butadiene; the catalyst comprises tungsten oxide supported on silica; and the temperature is in the range of about 600° to 1100°F.

14. The process of claim 1 wherein the polyene is butadiene-1,3; and the temperature is in the range of about 600° to 1100°F.

15. The process of claim 1 wherein the olefin reaction process is selected from:

A. the olefin reaction conversion of a nonconjugated acyclic polyene to form a mixture of products comprising at least one acyclic monoolefin having a fewer number of carbon atoms than the nonconjugated acyclic polyene feed and at least one acyclic polyene having a greater number of carbon atoms and at least one additional double bond than the nonconjugated acyclic polyene reactant;

B. the olefin reaction conversion of a mixture of a conjugated or nonconjugated acyclic polyene and a cyclic monoene to produce a product comprising an acyclic polyene having a number of carbon atoms equal to the sum of the carbon atoms of the reactants and containing a number of double bonds equal to the sum of the double bonds of the reactants;

C. the olefin reaction conversion of a mixture of a conjugated or nonconjugated acyclic polyene with an acyclic monoene having at least three carbon atoms to provide a product comprising at least one acyclic monoolefin having a fewer number of carbon atoms than the monoene reactant and at least one acyclic polyene having a greater number of carbon atoms than the polyene reactant and having the same number of double bonds as the polyene reactant; and D. the conversion of a conjugated acyclic polyene to form a mixture of products comprising at least one acyclic monoolefin having a fewer number of carbon atoms than the nonconjugated acyclic polyene feed and at least one acyclic polyene having a greater number of carbon atoms and at least one additional double bond than the nonconjugated acyclic polyene reactant.

16. The process of claim 2 wherein the temperature is in the range of about 600° to 1100°F.

17. The process of claim 15 (D) wherein said mixture of products comprises an aromatic hydrocarbon.

18. The process of claim 15 (D) wherein said conjugated acyclic polyene is selected from the group consisting of 1,3-butadiene and 1,3-pentadiene and said mixture of products comprises an aromatic hydrocarbon.

* * * * *